(No Model.) 2 Sheets—Sheet 1.

W. A. BOOTH.
SEWING MACHINE.

No. 550,245. Patented Nov. 26, 1895.

Witnesses
Jno. G. Hinkel
G. P. Kramer

Inventor
William A. Booth
By Foster & Freeman
Attorneys (No Model.) 2 Sheets—Sheet 2.

W. A. BOOTH.
SEWING MACHINE.

No. 550,245. Patented Nov. 26, 1895.

Witnesses
Jno. G. Huikel
A. N. Dobson

Inventor
William A. Booth
By Foster & Freeman
Attorneys

UNITED STATES PATENT OFFICE.

WILLIAM A. BOOTH, OF WOONSOCKET, RHODE ISLAND, ASSIGNOR TO THE WARDWELL SEWING MACHINE COMPANY, OF SAME PLACE AND NEW YORK, N. Y.

SEWING-MACHINE.

SPECIFICATION forming part of Letters Patent No. 550,245, dated November 26, 1895.

Application filed April 11, 1893. Serial No. 469,946. (No model.)

*To all whom it may concern:*

Be it known that I, WILLIAM A. BOOTH, a citizen of the United States, residing at Woonsocket, in the county of Providence and State of Rhode Island, have invented certain new and useful Improvements in Sewing-Machines, of which the following is a specification.

This invention has for its object, chiefly, to provide a suitable steam-joint for the removable horn of a wax-thread sewing-machine, so as to permit the steam employed for heating the horn to be passed through the chambers surrounding the wax-pot, the steam-joint and the pipes and passages connected therewith being so arranged as to allow a free circulation of the steam to and from the wax-cup and the horn, no matter what the position of the horn may be.

Figure 1:
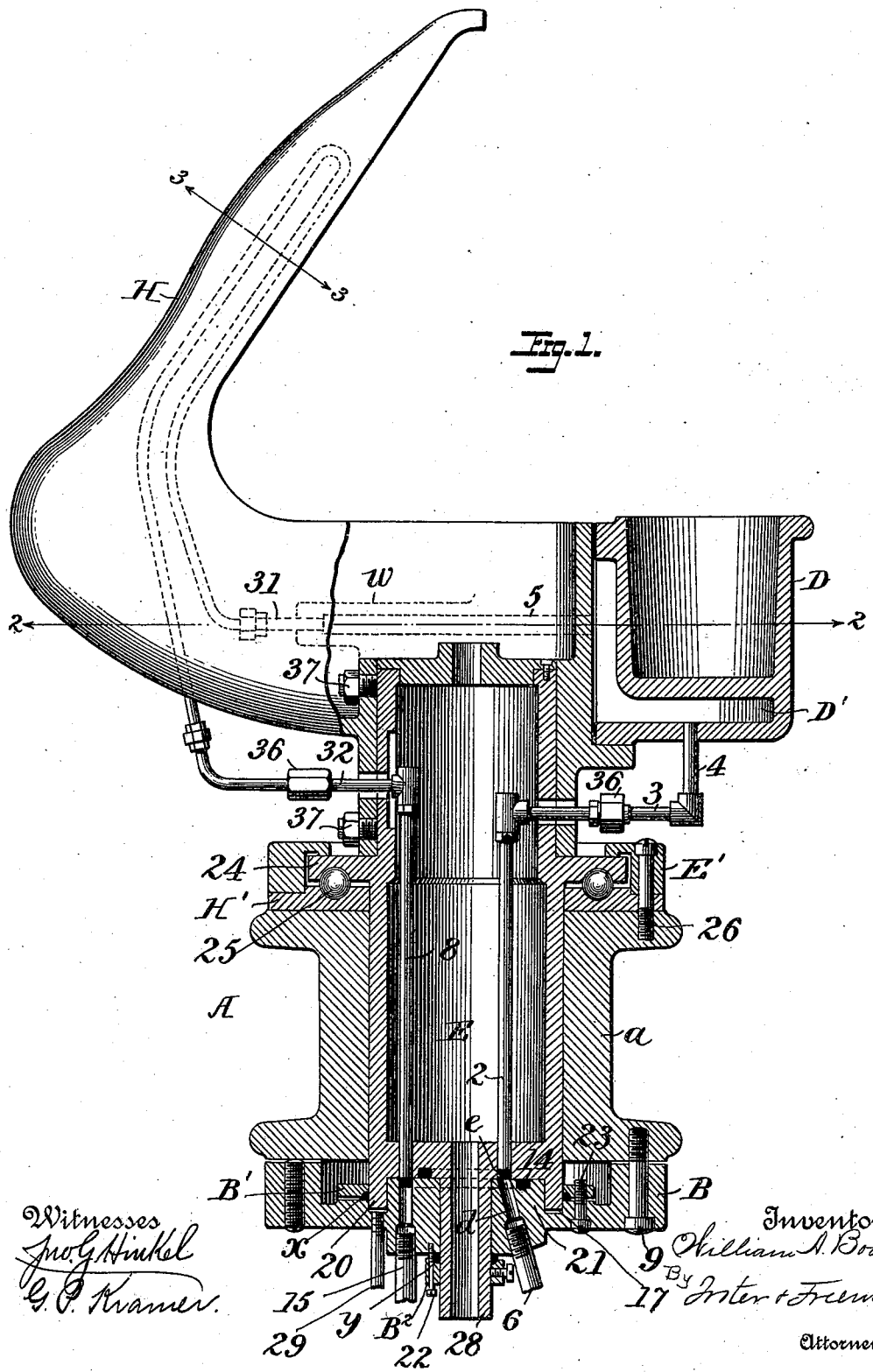
Figure 2:
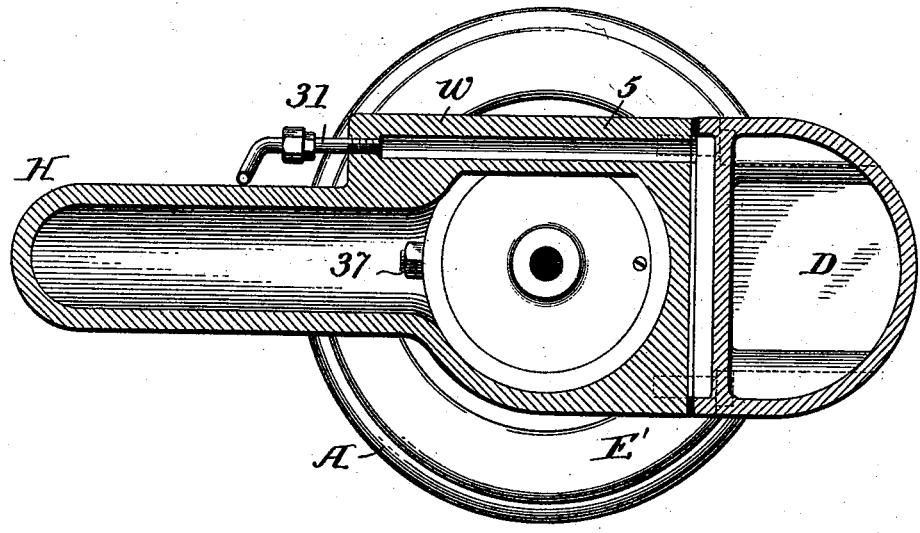
Figure 3:
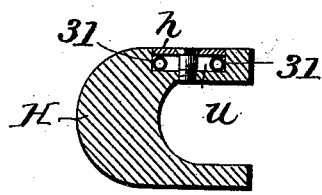

In the accompanying drawings, Figure 1 is a sectional elevation of sufficient of a wax-thread sewing-machine to illustrate my invention. Fig. 2 is a sectional plan on the line 2 2, Fig. 1; Fig. 3, a transverse section on the lines 3 3, Fig. 1.

A is that part of the stationary frame of a horn sewing-machine which constitutes the bearings for the horn, the said bearings consisting of the hollow bracket a, to which are clamped the cap B and the clamping-ring E', the former secured by bolts 9 and the latter by bolts 26.

Extending into a recess in and bolted detachably to the horn H is the hollow spindle E, provided near the upper end with a circular flange 24, over which extends the flange of the clamping-ring E', and between the flange 24 and the top of the bracket a, or preferably between the said flange and a steel bearing-plate H' at the top of the bracket a, are arranged a large number of hard-steel spheres or balls 25, which extend into corresponding grooves in the flange 24 and in the plate H', thereby constituting a ball-bearing support for the horn and the spindle E, which turns in the stationary hollow bracket a.

A tube 28 extends centrally from the lower end of the spindle E through a central opening in the clamped cap or ring B, and an annular flange 20, projecting from the end of the spindle E, extends around and incloses a circular boss or hub 21 upon the cap B. Against the outside of the flange 20 is confined an annular packing x between the cap B and a clamping-ring B', secured by bolts 23, and an annular packing y is around the tube 28 and is pressed against the latter by means of a packing-ring B², which is connected with the cap B by means of screws 22.

The wax-cup D is bolted detachably to one side of the horn H, and partially surrounding the wax-chamber in the said cup is a chamber D', to which steam or hot air is admitted. The steam passes to the horn through a stationary supply-pipe 6, which extends into an opening d in the cap B, the end of the said opening coinciding with an annular groove e in the end of the spindle E, and a pipe 2, communicating with the annular channel e, extends upward through the hollow spindle E and communicates with a lateral branch 3, extending through a side opening in the hollow spindle and in the horn and leading to a pipe 4, which communicates with the receptacle or chamber D'.

At one side of the horn is a horizontal enlargement w, through which extends a channel 5, communicating with the receptacle D' and also with a tube 31, which extends into a recess u at the side of the horn, which recess is covered by a cap-plate h, the said pipe 31 extending upward nearly to the top of the horn, and then being bent and extending downward below the bottom of the horn and communicating with a pipe 32, extending through lateral recesses in the hub of the horn and in the hollow spindle and connecting with a vertical pipe 8. The pipe 8 extends through the end of the spindle coinciding with an annular groove 14 in the hub 21 of the cap B, and with the said groove 14 communicates a pipe 15, constituting the discharge-pipe leading to any suitable point.

It will be evident that by the construction above described the horn is at liberty to turn freely in the stationary bracket or support a, and the entire weight is supported by the almost frictionless ball-bearings, but that, whatever may be the position of the horn, the pipe 2 is always in communication with the supply-pipe and the pipe 8 is always in communication with the discharge-pipe. It will further be seen that both the supply and receiving channels are in the hub portion 21 of the cap B, communicating with the pipes extending to the end of the hollow spindle E, that if there is any leakage it will be around the said hub 21 and will flow into the annular groove 17, that receives the flange 20, and will be discharged from said groove through the pipe 29, while the packings $x$ and $y$ effectually prevent the escape of any moisture at other points.

It will also be seen that the cap B can be readily detached, together with the parts connected therewith, so as to obtain ready access to any of the channels in case they should fill up, that the packings can be readily tightened by moving the rings B' B², and that access may be had to the ball-bearings by loosening the ring E'.

The pipes 3 and 32 are provided with couplings 36 to permit the horn to be removed without disturbing the other parts, this removal being effected by removing the screws 37, which connect the hub of the horn to the upper end of the hollow spindle E.

Without limiting myself to the precise construction and arrangement of parts shown, I claim—

1. The combination with the stationary bracket, the horn and spindle connected therewith, the latter being provided with a flange, of the ball bearings situated between the stationary bracket and the flange of the spindle, and the clamping ring E', connected with the stationary bracket and overlying the edge of the flange, substantially as set forth.

2. The combination of the bracket, horn, hollow spindle extending from the horn, a detachable cap piece B connected with the bracket and having a recess 17 and a hub 21 extending into a recess in the spindle, an annular flange 20 extending from the spindle into the recess 17 in the hub and a drip pipe connecting with the recess 17, substantially as set forth.

3. The combination of the bracket, horn, hollow spindle having an annular recess $e$, the cap B connected with the bracket and having an annular recess 14, an inlet pipe extending through the cap B in position to communicate with the recess $e$ and a discharge pipe communicating with the recess 14, and the heating pipes extending from the bottom of the horn spindle in position to communicate with the recesses $e$ and 14, substantially as set forth.

4. The combination of the bracket, the horn, the hollow spindle connected therewith and having an annular flange 20 near its lower end, and a centrally arranged tube 28, the cap B having the hub 21 arranged inside of the flange 20, the packing $x$ and $y$ arranged respectively between the cap and the flange 20 of the spindle, and the tube 28 thereof, and the steam pipe connections, substantially as set forth.

In testimony whereof I have signed my name to this specification in the presence of two subscribing witnesses.

WILLIAM A. BOOTH.

Witnesses:
WM. S. PRESTON,
EVERETT C. LEWIS.